March 25, 1958     F. V. ATKESON     2,827,739
IMPROVEMENT IN FABRICATING BENT LAMINATED ASSEMBLIES
Filed March 2, 1955     2 Sheets-Sheet 1

INVENTOR.
FLORIAN V. ATKESON
BY Oscar L. Spencer
HIS ATTORNEY

March 25, 1958 F. V. ATKESON 2,827,739
IMPROVEMENT IN FABRICATING BENT LAMINATED ASSEMBLIES
Filed March 2, 1955 2 Sheets-Sheet 2

INVENTOR.
FLORIAN V. ATKESON
BY
Oscar L. Spencer
ATTORNEY

United States Patent Office 2,827,739
Patented Mar. 25, 1958

2,827,739

IMPROVEMENT IN FABRICATING BENT LAMINATED ASSEMBLIES

Florian Victor Atkeson, Springdale, Pa., assignor to Pittsburgh Plate Glass Company, Allegheny County, Pa., a corporation of Pennsylvania Application March 2, 1955, Serial No. 491,719

6 Claims. (Cl. 49—84)

This invention relates to a method of preparing glass sheets for lamination, particularly, a method for bending glass sheets to the same curvature simultaneously prior to lamination having desirable characteristics by virtue of the method of fabrication employed.

It is well known that when glass sheets are subjected to heat, the viscosity of the glass decreases, and if the glass extends unsupported between support points or is mounted over a curved surface, its unsupported weight distorts the heat-softened glass, thus causing it to sag and assume the shape of the curved surface. Classically, the decrease in viscosity necessary to distort the glass to shape sheets into conformity with a mold has been accomplished by heat alone. Lillie determined that rapidly chilled glass has a lower viscosity than annealed glass, which is cooled slowly. In Reggiani Patent 2,674,067, this effect is used to shape individual glass sheets more rapidly than is possible using the classical method. Specifically, a sheet is tempered and then subjected to glass softening temperature to distort the tempered sheet. Since tempering consists of first heating the glass uniformly to above its annealing point immediately followed by its rapid chilling to below its annealing point, the glass interior has a lower viscosity following the tempering operation than when the glass is permitted to cool gradually or annealed. This difference in viscosity resulting from different thermal treatments is believed to exist because of a time lag between the temperature change and the change in molecular configuration associated with the forces of viscosity within the glass.

The present invention utilizers the above phenomenon for a more uniform, simultaneous bending of glass sheets into complex curvatures so that the sheets desired to comprise a laminated assembly are shaped into exact conformity with each other prior to laminating. The present invention is useful particularly in simultaneously bending sheets of glass of different thickness prior to lamination to form certain types of aircraft window closures, and also to produce intricate complex bends wherein flat glass sheets are curved into bends of varying curvatures along two angularly disposed axes.

In bending glass sheets by exposing the latter to glass softening temperatures, the thickness of a given sheet determines its rate of sag. Specifically, a thin sheet of a given shape will tend to soften more readily than a thick sheet of the same shape due to the relative facility by which thin sheets absorb the incident radiation.

Thus, when it is necessary to bend thin and thick sheets simultaneously, if the thin sheet is placed below the thick sheet and the assembly thus oriented mounted on a mold for exposure to glass softening temperature, the thin sheet sags more quickly than the thick sheet during the early stages of bending, and a space forms between the surfaces of the adjacent sheets due to the unequal bending of the glass sheets. This spacing enables hot dust particles and other foreign matter to become embedded upon the heat-softened glass surfaces, thereby impairing the optical properties of the glass sheets.

Should the heavy sheet be placed underneath the thin sheet for bending, the thin sheet bending is retarded, since more heating is required to start sagging the thicker underlying sheet. The thin sheet is thus subjected to more heat than is necessary for bending, and may even become fused to the other sheet.

The present invention avoids these problems by providing a unique method for effecting the simultaneous bending of sheets of different thicknesses by first tempering the thicker sheet to reduce its viscosity and then bending the thick and thin sheets simultaneously while the viscosity of the thick sheet is subnormal. Such treatment of the thicker sheet prior to exposing both sheets to heat sagging temperatures enables the two sheets to be bent at the same rate of speed. Furthermore, by increasing the rate of sagging of the thicker sheet, not only are the two sheets bent more rapidly, but also the sheets are maintained in more intimate contact with each other during the entire bending operation. Thus, the formation of gaps or air spaces, due to the glass sheets deforming at different rates, is prevented.

Furthermore, according to a preferred method coming within the framework of this invention, by mounting the thick tempered sheet above the thin sheet, the gravitational effect due to the weight of the thick sheet atop the thin sheet accelerates the rate of bending the thin sheet.

When doublets or multiplets (comprising two or more glass sheets having the same thickness and contour) are bent to complex curvatures prior to lamination with a sheet of plastic to produce automobile windshields, it is exceedingly difficult to have the sheets sag in synchronism so that they remain in intimate contact with each other throughout the bending cycle. This difficulty is enhanced when the sheets are to be bent to curves having varying radii along two axes angularly disposed relative to each other. The present invention improves the manufacture of such articles by first tempering one of the sheets and then mounting the tempered sheet atop the previously untreated sheet on a glass bending mold for exposure to glass softening temperature. The upper sheet remains in intimate contact with the lower sheet by virtue of its lower viscosity due to its previous tempering. Hence, when the bending cycle is completed, the sheets are matched perfectly, despite the complexity of the bend they undergo.

Accordingly, the primary object of the present invention is to provide an improvement in the art of bending glass sheets simultaneously.

Another object is to fabricate improved laminated assemblies of coxplex curvatures not readily attainable previously.

Still another object of the present invention is to prepare glass sheets of different thickness for lamination.

The above and other objects of the present invention will become apparent upon a study of the following description taken in conjunction with the accompanying drawings. In the drawings, Figure 1 is a cross sectional view showing a pair of glass sheets mounted on a convex bending mold for bending thereon;

Figure 1:
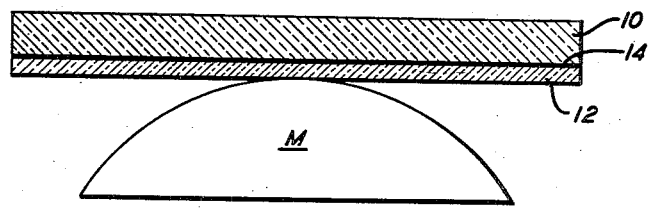

In Figure 1, a thick sheet 10 and thin sheet 12 are shown mounted upon a mold M for bending. These sheets are separated by a suitable parting material 14 of mica, diatomaceous earth, or other suitable material that minimizes fusion of the glass sheets during their exposure to glass softening temperature.

Figure 2:
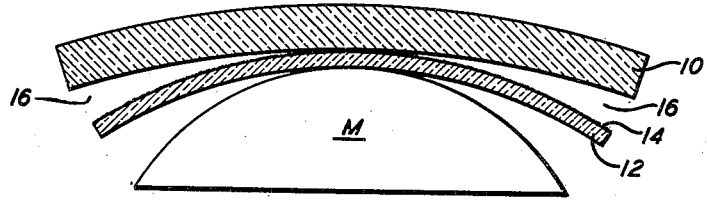
Figure 2 shows a typical separation occurring during the bending operation when glass sheets of different thicknesses are bent without utilizing the teaching of the present invention.
Figure 3:
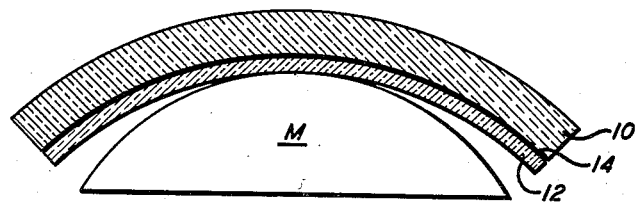
Figure 3 shows how glass sheets of different thicknesses remain in intimate contact during bending when the thicker sheet has been treated in accordance with the present invention.

When sheet 10 is not treated by tempering, bottom sheet 12 sags more quickly toward the shape defined by the mold M, thus causing spaces 16 to form between the extremities of the thin and thick glass sheets. Figure 2 shows such a development characteristic of prior art bending. However, if thick sheet 10 is tempered previously so that its internal viscosity is lowered sufficiently, when the mold and the glass sheets 10 and 12 are subjected to glass softening temperatures, the thicker sheet 10 softens quite readily and remains in intimate contact with the thin sheet 12 during the entire bending operation, as seen in Figure 3. In fact, the weight of the thick sheet 10 upon the unsupported portion of the thin sheet 12 accelerates the rate of bending of the bottom sheet.

It is possible that by controlling the temper imparted to the relatively thick sheet 10, intimate contact may be maintained in certain cases when thin and thick sheets are heated simultaneously over a mold, wherein the thin sheet is placed above the thick sheet for the bending operation. However, it is preferable to place the previously tempered thick sheet above the thin sheet for bending by heat sagging, thus insuring that the thick sheet, which is more easily deformed because of its previous tempering, remains in intimate contact with the thin sheet throughout the bending operation.

When the sheets 10 and 12 have been bent according to the method described above, they are separated and a suitable sheet of a plastic material such as polyvinyl butyral is inserted between the sheets, and the assemblies are then subjected to temperatures and pressures according to accepted laminating procedures to produce articles of laminated safety glass.

If glass sheets are bent simultaneously upon molds having a concave elevational configuration, the finally bent sheets tend to be spaced from each other because of the unequal bending, especially in cases where the glass is to be bent to non-uniform curvatures. The upper sheet tends to bridge the region requiring most severe curving in such a case. However, by treating one sheet to reduce its viscosity prior to placing it atop the other sheet for mounting upon a bending mold for exposure to glass softening temperature, the sheets are bent in continuous intimate contact. No spacing is present between the sheets.

Unless the above precautions are taken, the sheets are separated locally due to unequal bending. The resulting laminated article obtains many flaws, such as optical imperfections due to uneven flow of the plastic interlayer into the areas of relative separation between the glass sheets, oil penetration into the spaced portions during autoclaving, and formation of air pockets, which mar the optical perfection of the assembly. In addition, the assembly is liable to break during lamination because of the tension forces that are established in the regions of separation during the laminating procedure.

The present invention also envisions minimizing the tendency of the bottom sheet of a doublet or a multiplet to bridge across the region of greatest curvature of a concave glass bending mold. This is accomplished by imparting a partial temper to the bottom sheet of a doublet and a more severe temper to the upper sheet of the doublet. Thus, sagging the lower sheet to conform to the shape of the mold is facilitated by virtue of the lower glass viscosity resulting from its partial tempering. The upper glass sheet, being more tempered than the lower sheet, sags more readily than the latter and thus remains in far greater intimate contact with the bottom sheet during the bending cycle than if both sheets had identical histories of treatment. For similar reasons, these principles may be utilized to bend doublets or multiplets on either concave or convex glass bending molds.

Figure 4:
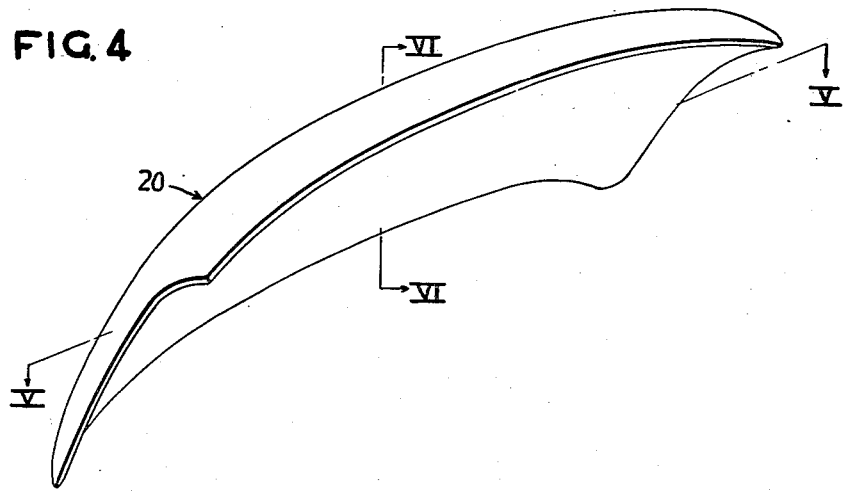
Figure 4 is an isometric view of a typical complex laminated windshield producible more efficiently following the teaching of the present invention.
Figure 5:
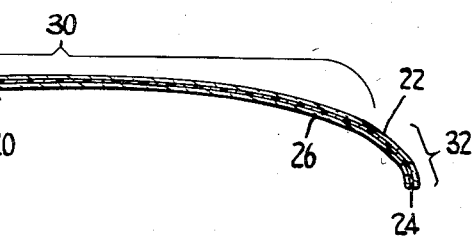
Figure 5 is a longitudinal sectional view along the line V—V of Figure 4.
Figure 6:
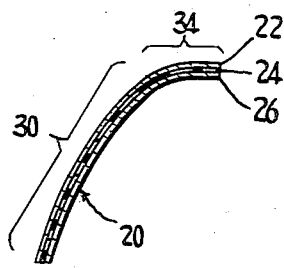
Figure 6 is a transverse sectional view along the line VI—VI of Figure 4.

Figures 4, 5 and 6 show various views of a typical complexly curved windshield susceptible of being more efficiently produced following the teachings of the present invention. A laminated windshield 20 comprises a glass sheet 22, a thermoplastic, transparent interlayer 24, and an additional glass sheet 26 curved in matched relation in both elevation and contour to the curvature of sheet 22. The laminated assembly comprises a main portion 30 curving severely adjacent each longitudinal extremity to form wing portions 32 extending in one direction in substantially parallel planes substantially perpendicular to the plane tangential to the center of the main portion 30. One side of the main portion 30 is curved to form a portion 34 which is intended to form the forward part of a roof of an automobile. Roof portion 34 extends in the same direction as wing portions 32 in a plane approaching perpendicularity to the plane tangential to the wing portions. Since the inner surface of this shaped assembly is concave facing the driver and the outer surface is convex, the sheet originally provided with the temper may be sheet 22 if the doublet is bent upon a male mold. However, if the doublet is to be bent upon a female mold prior to lamination, then sheet 26 is to be tempered.

It is known that when the tempered sheets are subjected to glass bending temperatures according to the requirements for bending glass sheets into complex shapes, that the stresses associated with tempering are relieved, and the glass sheet has substantially the same stress pattern after bending as though it were not tempered prior to bending. However, the laminated assemblies resulting from using the teaching of my invention in their fabrication are less prone to optical distortion and breakage than laminated assemblies composed of sheets having identical thermal histories, such as is inherent in prior art bending and laminating procedures.

What is claimed is:

1. In the method of bending glass sheets of identical contour to identical curved shapes simultaneously, the improvement comprising first tempering one sheet only, then mounting the sheets in alignment upon a glass bending mold having an upper shaping surface, and subjecting the glass sheets and the mold to glass softening temperatures to have the sheets sag into conformity with the shaping surface of the mold.

2. In the method of bending glass sheets of identical contour but different thicknesses to identical curved shapes simultaneously, the improvement comprising first tempering a thicker sheet, then mounting the sheets in alignment upon a glass bending mold having an upper shaping surface, and subjecting the glass sheets and the mold to glass softening temperatures to have the sheets sag into conformity with the shaping surface of the mold.

3. In the method of bending glass sheets of identical contour but different thicknesses to identical curved shapes simultaneously, the improvement comprising first tempering a thicker sheet, then mounting the sheets in alignment upon a glass bending mold having an upper shaping surface with the thicker sheet above the thinner sheet, and subjecting the glass sheets and the mold to glass softening temperatures to have the sheets sag into conformity with the shaping surface of the mold.

4. A method of bending two sheets of glass of different thicknesses simultaneously preparatory to laminating comprising tempering the thicker sheet only, applying a suitable parting material on a surface of the thinner sheet, mounting the thinner sheet with its top surface covered with parting material upon a glass bending mold having an upper shaping surface, mounting the thicker sheet above the thinner sheet in alignment therewith, and subsequently exposing the sheets and the glass bending mold to glass softening temperatures until both sheets have sagged to conform to the shaping surface of the mold.

5. In the method of preparing two flat glass sheets of different thicknesses for lamination into curved shapes, the improvement comprising subjecting the thicker sheet to a different thermal history than the thinner sheet in order to provide the thicker sheet with less internal viscosity than the thinner sheet, said different thermal history comprising heating the thicker sheet to above its annealing point immediately followed by its rapid chilling to below its annealing point, thereafter simultaneously subjecting the two sheets to glass softening temperatures while mounted on a single glass shaping mold.

6. In the method of preparing two flat glass sheets for laminating into curved shapes, the improvement comprising subjecting one sheet to a different thermal history than the other sheet in order to provide the one sheet with less internal viscosity than the other sheet, said different thermal history comprising heating the one sheet to above its annealing point immediately followed by its rapid chilling to below its annealing point, mounting the other sheet on a glass bending mold having an upper shaping surface, mounting the one sheet over the other sheet in alignment therewith, and simultaneously subjecting the two sheets to glass softening temperatures until the sheets have sagged to the mold shaping surface.

References Cited in the file of this patent

UNITED STATES PATENTS

| 2,377,849 | Binkert et al. | June 12, 1945 |
| 2,470,461 | Black | May 17, 1949 |

FOREIGN PATENTS

| 443,536 | Great Britain | Mar. 2, 1936 |